US006337622B1

(12) United States Patent
Sugano

(10) Patent No.: US 6,337,622 B1
(45) Date of Patent: Jan. 8, 2002

(54) DSRC CAR-MOUNTED EQUIPMENT

(75) Inventor: Takayuki Sugano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 20 days.

(21) Appl. No.: 09/614,190

(22) Filed: Jul. 11, 2000

(30) Foreign Application Priority Data

Apr. 6, 2000 (JP) .......................................... 12-104486

(51) Int. Cl.[7] .................................................. B60Q 1/00

(52) U.S. Cl. ....................... 340/438; 340/928; 239/384; 342/380; 343/713

(58) Field of Search ................................ 340/438, 439, 340/425.5, 440, 901, 905, 825.5, 928; 238/384, 378, 380; 455/507, 517; 342/380, 381, 382; 343/713, 711

(56) References Cited

U.S. PATENT DOCUMENTS 6,166,649 A * 12/2000 Inoue ......................... 340/660
6,181,023 B1 * 1/2001 Inoue ........................ 307/10.1

FOREIGN PATENT DOCUMENTS

JP 11-64416 3/1999

* cited by examiner

*Primary Examiner*—Anh V. La
(74) *Attorney, Agent, or Firm*—Sughrue Mion, PLLC

(57) ABSTRACT

A DSRC car-mounted equipment which prevents, in advance, inconvenience caused by disorder in the antenna unit of the car-mounted equipment. A DSRC car-mounted equipment comprises a main body 1 of a car-mounted equipment having a control unit 10 and an antenna unit 12 for executing radio communication with an on-the-road equipment, information output means 13, 14 connected to the control unit, a checking unit 2 having a checking circuit unit 20 and a checking antenna unit 21 for executing radio communication with the antenna unit of the car-mounted equipment, and an antenna-judging means for judging the communication ability of the antenna unit of the car-mounted equipment based on the communication state of check signal waves D between the antenna unit 12 of the car-mounted equipment and the checking antenna unit 21, wherein the antenna-judging means produces an alarm signal when the communication ability of the antenna unit 12 of the car-mounted equipment is smaller than a predetermined value, and the control unit 10 of the car-mounted equipment drives the information output means 13, 14 in response to the alarm signal to produce an alarm.

12 Claims, 10 Drawing Sheets

DSRC CAR-MOUNTED EQUIPMENT

BACKGROUND OF THE INVENTION

1. Field of the Invention

The present invention relates to a DSRC (dedicated short-range communication) car-mounted equipment used for an ETC (electronic toll collection) system in an ITS (intelligent transport system). More specifically, the invention relates to a DSRC car-mounted equipment which automatically checks, in advance, disorder in the communication caused by a drop in the radio communication power level (communication ability) of the main body of the car-mounted equipment and alarms the driver in case disorder has occurred.

2. Prior Art

In a DSRC car-mounted equipment used for a toll collection system such as ETC, in general, the main body of the car-mounted equipment having an antenna unit is usually installed near a dashboard (on or in the dashboard) in the compartment in order to transmit and receive signal waves of a sufficient degree of level to and from a radio equipment in an on-the-road equipment on the road side.

Further, a control unit in the main body of the car-mounted equipment is so constituted as to establish a communication circuit relative to the on-the-road equipment by receiving signal waves from the radio equipment of the road side through the antenna unit of the car-mounted equipment and, then, transmitting signal waves toward the radio equipment of the road side.

Usually, therefore, the DSRC car-mounted equipment remains in a state of receiving signals from the on-the road equipment.

In particular, the conventional DSRC car-mounted equipment is not equipped with means for checking the antenna unit of the car-mounted equipment and, hence, remains in a state of receiving signals irrespective of the conditions in the compartment or the state of installing the antenna unit of the car-mounted equipment.

As is well known, on the other hand, the DSRC car-mounted equipment used for the toll collection system is based on a dedicated short-range communication and, hence, the antenna unit of the car-mounted equipment exhibits a sharp directivity toward the radio equipment of the road side that is located at a position higher than the vehicle.

Therefore, when a driver carelessly puts an obstacle (book or clothing) that may interrupt the propagation of electromagnetic waves on the antenna unit of the car-mounted equipment, or when the antenna unit of the car-mounted equipment is installed in an extremely inclined manner at the time of mounting the main body of the car-mounted equipment, the signal waves from the radio equipment of the road side are not sufficiently received by the antenna unit of the car-mounted equipment, which may cause a fatal hindrance to the communication function of the main body of the car-mounted equipment.

That is, when the signal waves from the radio equipment of the road side are not received due to an obstacle placed on the antenna unit of the car-mounted equipment, the conventional DSRC car-mounted equipment is not capable of detecting the obstacle. Therefore, despite the vehicle enters into the communication region with the on-the-road equipment, the standby state for receiving signals continues and the communication circuit may not be established.

Similarly, when the antenna unit of the car-mounted equipment is installed being conspicuously inclined, the reception power level (reception intensity) greatly decreases for the antenna unit of the car-mounted equipment, and the communication circuit may not be established, either.

When the vehicle has entered into the automatic toll collection lane on a toll road, the toll collection function is invalidated since no communication circuit is established between the antenna unit of the car-mounted equipment and the radio equipment of the road side and, hence, the vehicle must be forcibly stopped in the automatic toll collection lane.

In order to solve the above-mentioned problem, Japanese Unexamined Patent Publication (Kokai) No. 11-64416 proposes a device for checking the car-mounted equipment.

According to the device disclosed in the above publication, however, a worker must move to a place where the checking device is installed to check disorder of the car-mounted equipment, lacking practicability.

As described above, the conventional DSRC car-mounted equipment is not provided with means for checking the communication ability of the antenna unit of the car-mounted equipment. Therefore, the driver cannot recognize the disorder in the antenna unit of the car-mounted equipment despite the signal waves from the radio equipment of the road side may not have been received to a sufficient degree by the antenna unit of the car-mounted equipment, and the communication is not accomplished with the radio equipment of the road side, causing various inconveniences.

SUMMARY OF THE INVENTION

The present invention was accomplished in order to solve the above-mentioned problem and has an object of providing a DSRC car-mounted equipment which automatically checks disorder in the antenna unit of the car-mounted equipment due to a drop in the communication ability, and informs the driver of disorder in the antenna unit of the car-mounted equipment to prevent the occurrence of inconvenience in advance.

The DSRC car-mounted equipment according to the invention comprises:

a main body of a car-mounted equipment having a control unit and an antenna unit for executing radio communication with an on-the-road equipment installed on a road on which a vehicle travels;

information output means connected to the control unit;

a checking unit arranged in the vehicle so as to be positioned between the antenna unit of the car-mounted equipment and a radio equipment of the road side of the on-the-road equipment, and having a checking circuit unit and a checking antenna unit for executing radio communication with the antenna unit of the car-mounted equipment; and an antenna-judging means for judging the communication ability of the antenna unit of the car-mounted equipment based on the communication state of check signal waves between the antenna unit of the car-mounted equipment and the checking antenna unit; wherein the antenna-judging means produces an alarm signal when the communication ability of the antenna unit of the car-mounted equipment is smaller than a predetermined value; and the control unit of the car-mounted equipment drives the information output means in response to the alarm signal to produce an alarm.

In the DSRC car-mounted equipment according to the invention, the antenna-judging means produces an alarm signal when the reception intensity at the checking antenna unit of the check signal waves transmitted from the antenna unit of the car-mounted equipment is smaller than a predetermined value.

In the DSRC car-mounted equipment according to the invention, the antenna-judging means produces an alarm signal when the reception intensity at the antenna unit of the check signal waves transmitted from the checking antenna unit is smaller than a predetermined value.

In the DSRC car-mounted equipment according to the invention, the intensity for transmitting the check signal waves is set to a value smaller than a normal transmission intensity of from the antenna unit of the car-mounted equipment to the radio equipment of the road side.

In the DSRC car-mounted equipment according to the invention, the check signal waves are transmitted when the power source circuit is closed.

The DSRC car-mounted equipment according to the invention further comprises a vehicle speed detector unit for detecting the speed of a vehicle, and a stop-judging means for judging the halted state of the vehicle based on the vehicle speed, wherein the check signal waves are transmitted when the vehicle is brought into a halt.

In the DSRC car-mounted equipment according to the invention, the information output means includes at least either a display unit or a voice output unit.

In the DSRC car-mounted equipment according to the invention, the main body of the car-mounted equipment is arranged near the dashboard of the vehicle, and the checking unit is arranged near the windshield of the vehicle.

The DSRC car-mounted equipment according to the invention further comprises a cable for electrically connecting the main body of the car-mounted equipment to the checking unit, wherein the control unit of the car-mounted equipment transmits a check signal wave transmission timing to the checking unit through the cable.

In the DSRC car-mounted equipment according to the invention, the checking unit is isolated from the main body of the car-mounted equipment, and the equipment control unit of the car-mounted equipment transmits a check signal wave transmission timing to the checking unit by radio communication.

In the DSRC car-mounted equipment according to the invention, the antenna-judging means produces an alarm signal when no response signal is obtained from the checking unit at the time of transmitting the check signal waves.

In the DSRC car-mounted equipment according to the invention, the control unit of the car-mounted equipment transmits and receives data related to the toll collection to and from the on-the-road equipment installed on a toll road, and automatically receives the toll based on the data related to the toll collection.

DESCRIPTION OF THE PREFERRED EMBODIMENTS

Embodiment 1

An embodiment 1 of the present invention will now be described in detail with reference to the drawings.

Figure 1:
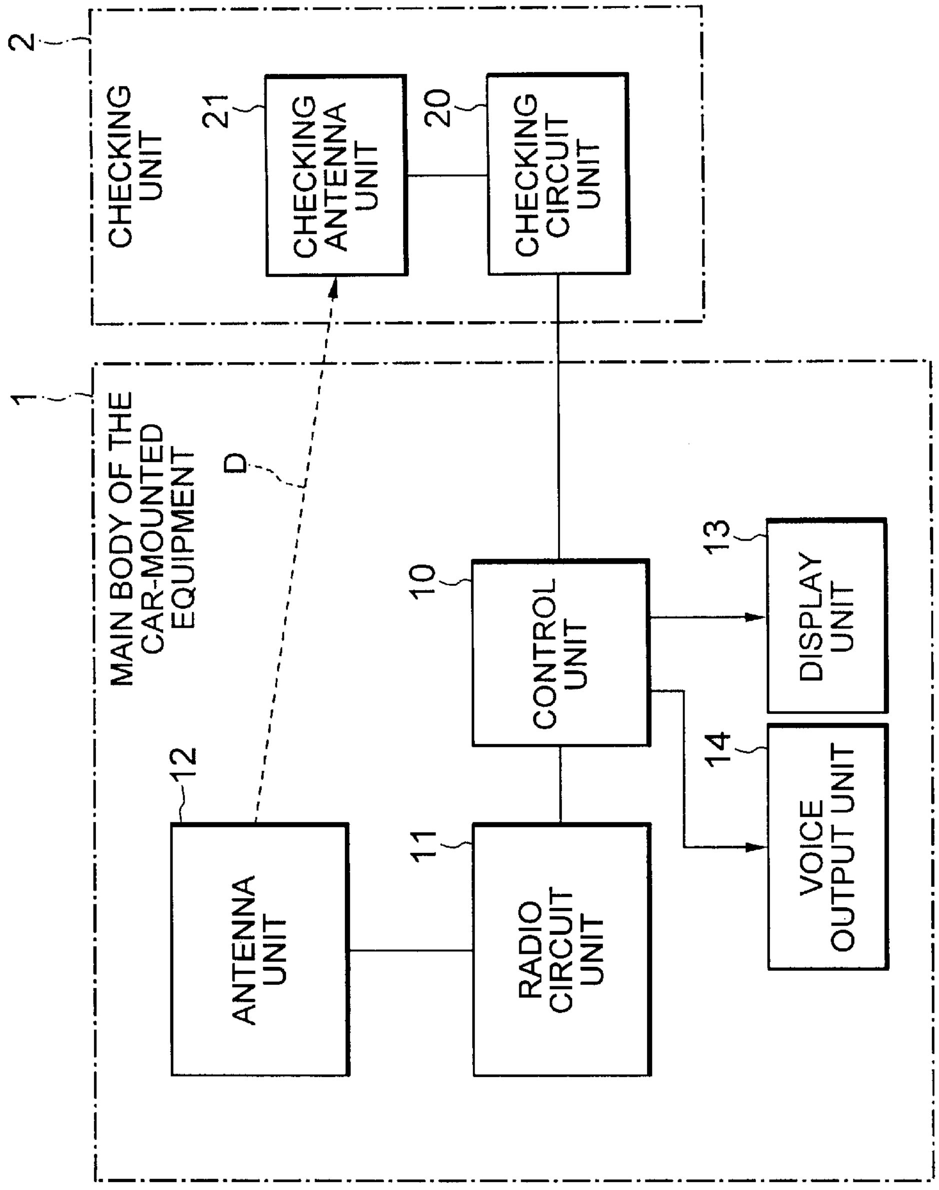
FIG. 1 is a block diagram illustrating the functional constitution according to an embodiment 1 of the present invention.

FIGS. 1 to 7 are diagrams for illustrating the embodiment 1 of the present invention, and wherein FIG. 1 is a block diagram illustrating the functional constitution of a main body 1 of a car-mounted equipment and of a checking unit 2.

Figure 2:
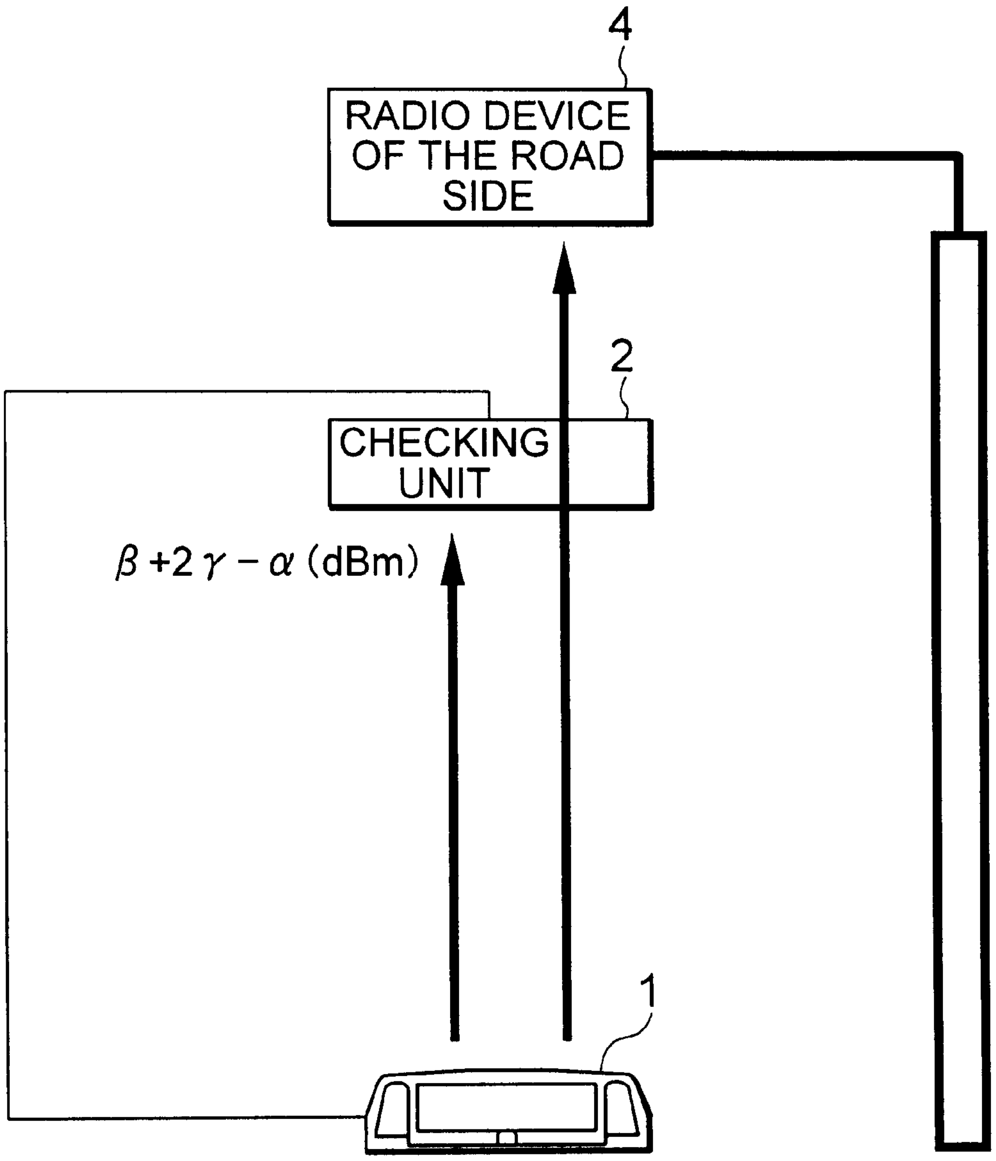
FIG. 2 is a block diagram illustrating a positional relationship to a radio device of the road side according to the embodiment 1 of the present invention together with the intensity of reception during the normal condition.
Figure 3:
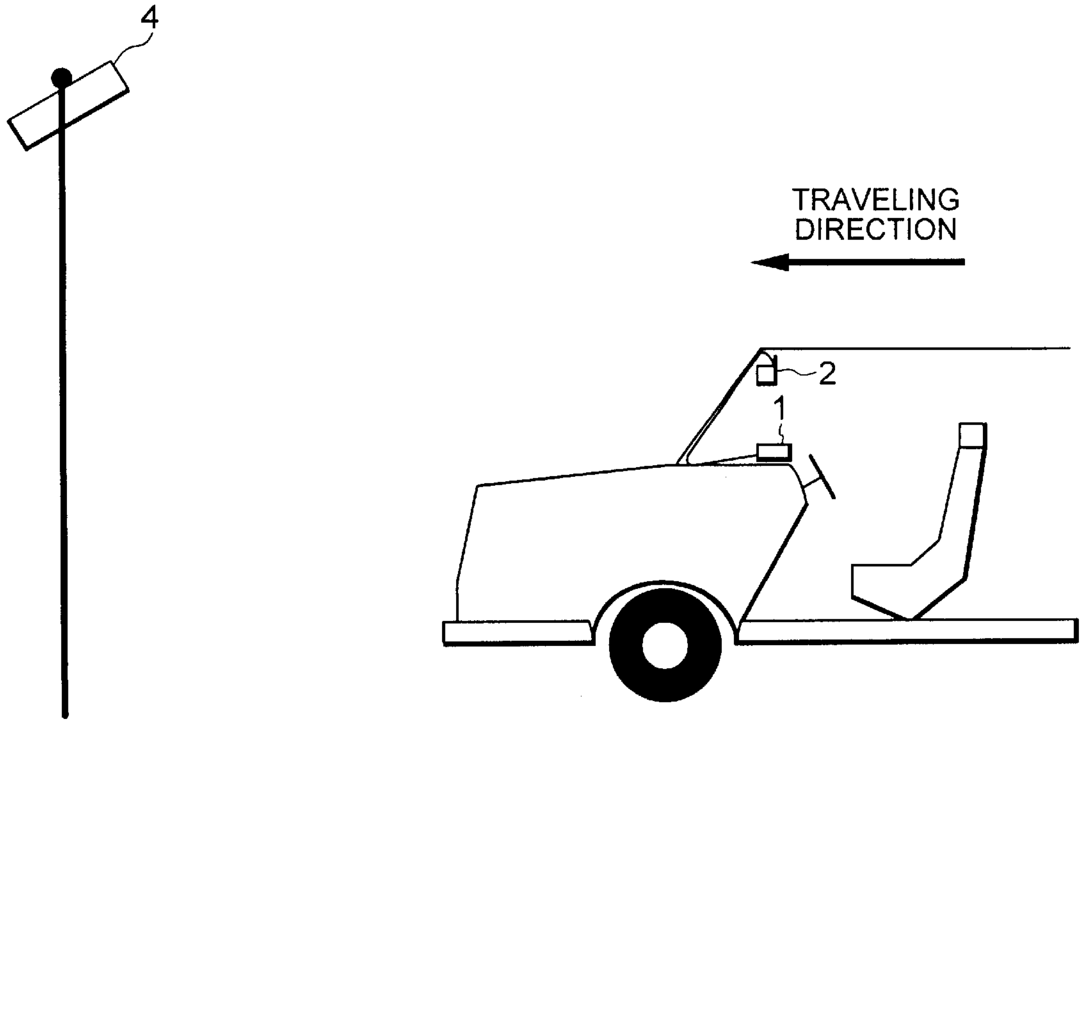
FIG. 3 is a side view illustrating an apparent positional relationship to the radio device of the road side according to the embodiment 1 of the present invention.
Figure 4:
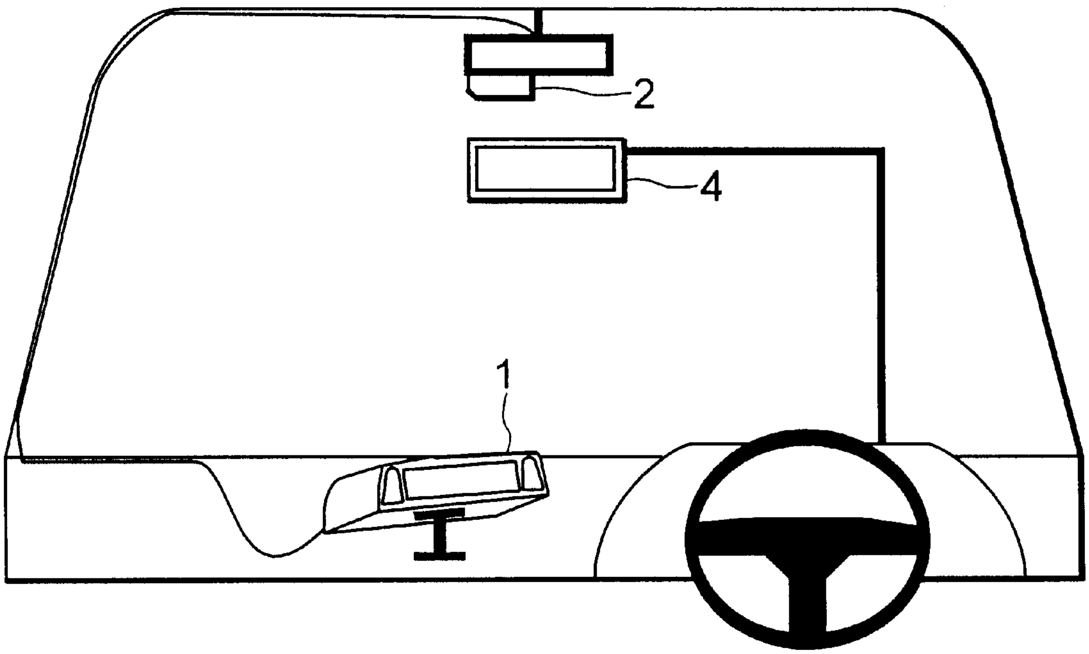
FIG. 4 is a front view illustrating the positional relationship to the radio device of the road side according to the embodiment 1 of the present invention of when seen from inside the vehicle.
Figure 5:
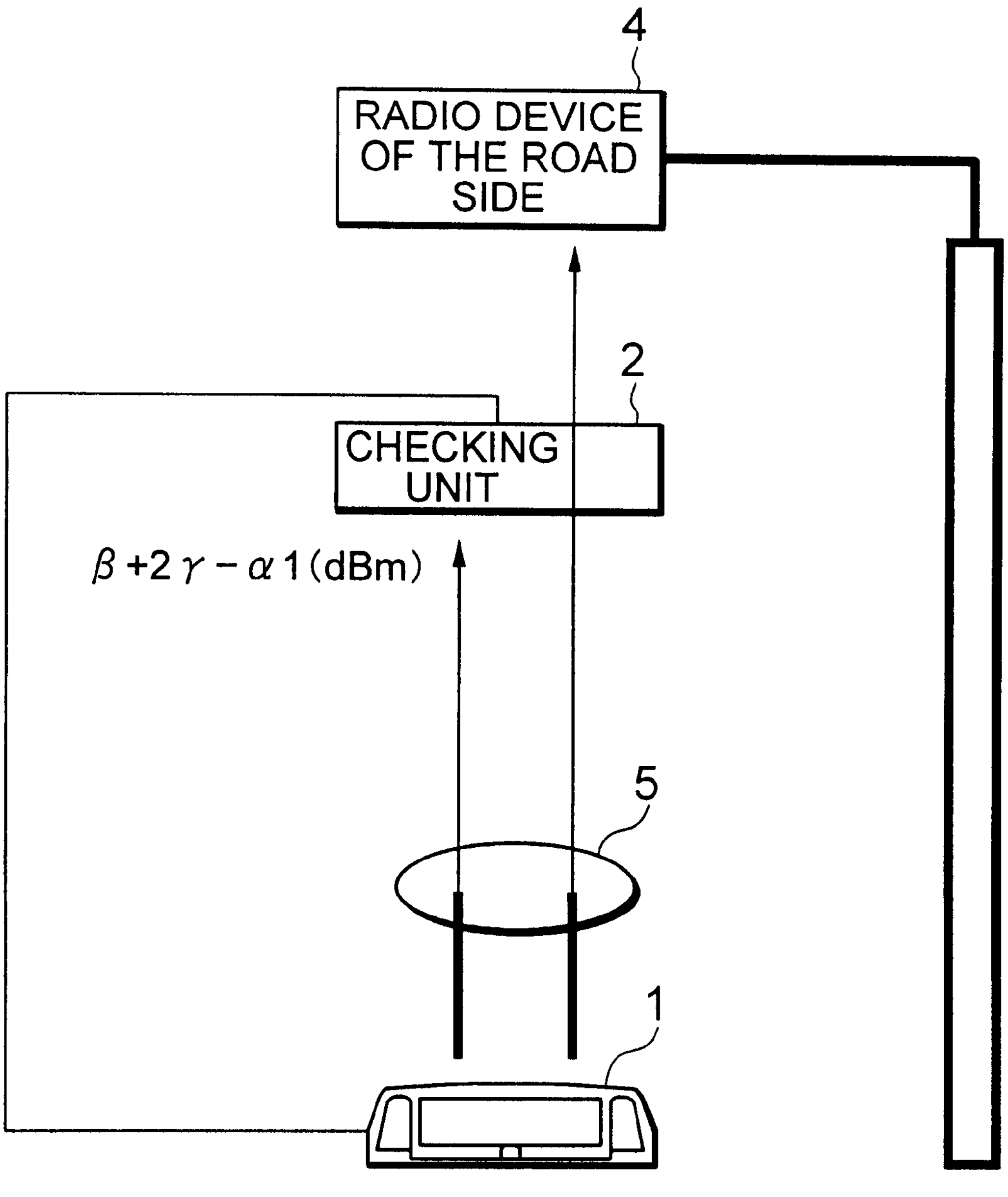
FIG. 5 is a block diagram schematically illustrating the positional relationship to the radio device of the road side according to the embodiment 1 of the present invention together with the intensity of reception through an obstacle.

FIGS. 2 to 5 are views illustrating a positional relationship among the main body 1 of the car-mounted equipment, the checking unit 2 and a radio device 4 of the road side, and wherein FIG. 2 is a schematic block diagram, FIG. 3 is an apparent side view, FIG. 4 is a front view as seen from the inside of the vehicle, and FIG. 5 is a schematic block diagram illustrating a case where there is an obstacle 5.

Figure 6:
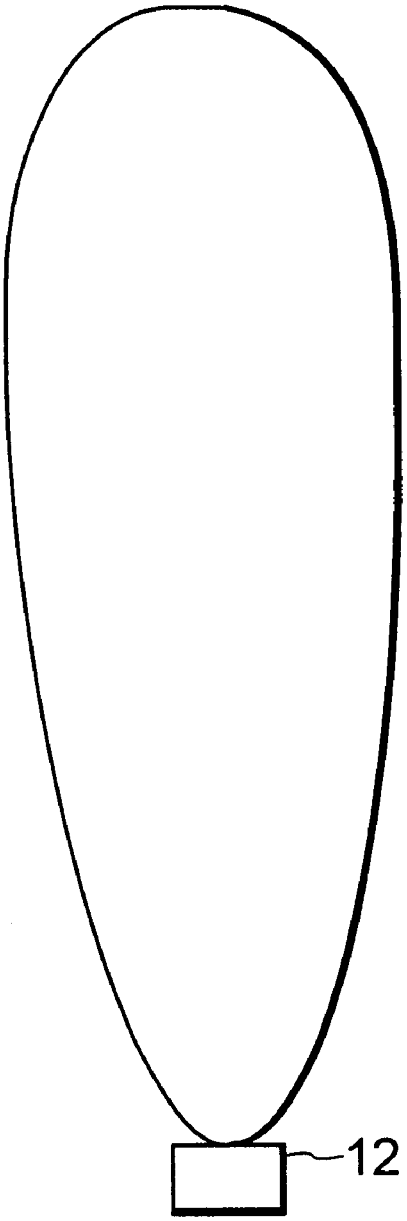
FIG. 6 is a diagram illustrating the directivity of an antenna unit of a car-mounted equipment according to the embodiment 1 of the present invention.
Figure 7:
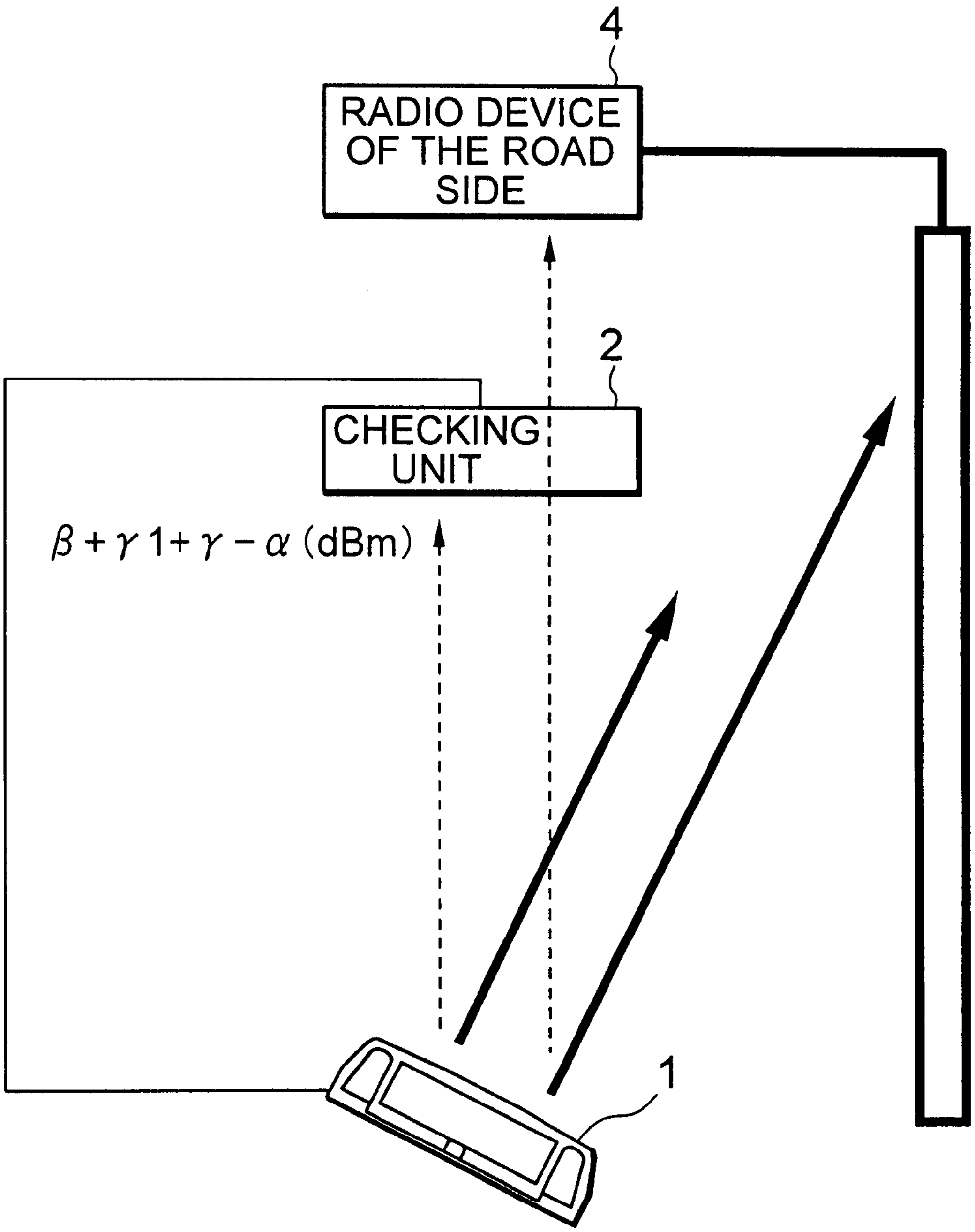
FIG. 7 is a block diagram illustrating the positional relationship to the radio device of the road side according to the embodiment 1 of the present invention together with the intensity of reception of when the main car-mounted equipment body is inclined.

FIG. 6 is a diagram illustrating the directivity of an antenna unit 12 of the car-mounted equipment, and FIG. 7 is a block diagram schematically illustrating the positional relationship to the radio device 4 of the road side of when the main body 1 of the car-mounted equipment is inclined.

Representatively described here is a case of the ETC car-mounted equipment.

In this case, an external storage medium (not shown) such as IC card storing various ETC data is connected to the main body 1 of the car-mounted equipment.

In FIG. 1, the main body 1 of the car-mounted equipment includes a control unit 10, a radio circuit unit 11, an antenna unit 12, a display unit 13 and a voice output unit 14.

The checking unit 2 includes a checking circuit unit 20 and a checking antenna unit 21.

The control unit 10 in the main body 1 of the car-mounted equipment executes radio communication with the on-the-road equipment installed on a road on which the vehicle travels through the antenna unit 12 of the car-mounted equipment and the radio circuit unit 11.

The checking circuit unit 20 in the checking unit 2 executes checking radio communication with the main body 1 of the car-mounted equipment through the checking antenna unit 12 and the antenna unit 12 of the car-mounted equipment.

At the time of checking the antenna unit 12 of the car-mounted equipment, the checking antenna unit 21 receives check signal waves D from the antenna unit 12.

Further, the checking circuit unit 20 in the checking unit 2 includes an antenna unit-judging means, judges disorder in the antenna unit 12 of the car-mounted equipment in cooperation with the control unit 10, and produces an alarm signal when disorder has occurred.

The display unit 13 and the voice output unit 14 connected to the control unit 10 are constituting an information output means, and at least either one of them is driven when the communication ability of the antenna unit 12 of the car-mounted equipment is smaller than a predetermined value (when disorder is detected).

In FIGS. 2 to 4, the checking unit 2 is arranged in the vehicle so as to be located between the antenna unit 12 of the car-mounted equipment and the radio device 4 of the road side in the on-the-road equipment.

Here, the checking circuit unit 20 in the checking unit 2 is electrically connected to the control unit 10 in the main body 1 of the car-mounted equipment through a cable.

The main body 1 of the car-mounted equipment is arranged near the dashboard of the vehicle, and the checking unit 2 is installed in an upper part of the windshield over the main body 1 of the car-mounted equipment.

Next, described below is the operation for detecting disorder in the antenna unit 12 of the car-mounted equipment according to the embodiment 1 of the present invention shown in FIGS. 1 to 4.

First, when the power source circuit is closed, the control unit 10 of the car-mounted equipment transmits a check signal wave D transmission timing to the checking unit 2 through the cable thereby to drive the antenna unit-judging means.

In response to this, a response signal is sent from the checking unit 2 back to the main body 1 of the car-mounted equipment through the cable.

After the response signal is formed, the check signal waves D are transmitted from the antenna unit 12 of the main body 1 of the car-mounted equipment to the checking antenna unit of the checking unit 2.

That is, when the car-mounted unit is driven, the control unit 10 in the car-mounted equipment sends a check signal to the radio circuit unit 11 of the car-mounted equipment. The check signal is modulated through the radio circuit unit 11 in the car-mounted equipment, and is transmitted from the antenna unit 12 of the car-mounted equipment as check signal waves D having an intensity smaller than that of during the normal transmission.

The antenna-judging means in the checking unit 2 judges the condition of communication ability of the antenna unit 12 of the car-mounted equipment based on the communication of check signal waves between the antenna unit 12 of the car-mounted equipment and the checking antenna unit 21.

That is, the antenna-judging means in the checking unit 2 compares, with a predetermined value, a power level (intensity of reception) of the check signal waves D transmitted from the antenna unit 12 of the car-mounted equipment and received by the checking antenna unit 21, and judges the condition of the communication ability of the antenna unit 12 of the car-mounted equipment relying upon whether the intensity of reception is lying within a normal range.

When the communication ability of the antenna unit 12 of the car-mounted equipment is smaller than the predetermined value, the antenna-judging means sends an alarm signal to the control unit 10 in the car-mounted control unit through the cable.

In response to the alarm signal, the control unit 10 in the car-mounted equipment drives the display unit 13 and the voice output unit 14 to inform the driver of alarm by turning an alarm lamp on or by producing a buzzer sound.

That is, when the antenna unit 12 of the car-mounted equipment is detected to be in bad condition, the antenna-judging means in the checking unit 2 causes the control unit 10 in the car-mounted equipment to drive the display unit 13 and the voice output unit 14 to produce an alarm.

Referring, for example, to FIG. 2, when there is no obstacle in the compartment and the main body 1 of the car-mounted equipment is properly installed, the antenna unit 12 of the car-mounted equipment is capable of executing normal communication with the radio device 4 of the road side.

In FIG. 2, if free space loss in the compartment is denoted by $\alpha$ [dB], transmission power of weak check signal waves D by $\beta$ [dBm], and the gains of the antenna unit 12 of the car-mounted equipment and of the checking antenna unit 21 by $\gamma$ [dBi], respectively, then, the input power to the checking unit 2 through the checking antenna unit 21 is expressed as $\beta+2\gamma-\alpha$ [dBm].

Therefore, when the input power level (intensity of reception) at the antenna unit 12 of the car-mounted unit lies within a predetermined range ($\beta+2\gamma-\alpha\pm\delta$ [dBm]) necessary for the communication, the checking circuit unit 20 outputs a signal obtained upon detecting the check signal waves D to the control unit 10 in the car-mounted equipment through the cable.

The control unit 10 in the car-mounted control unit collates a check signal that is produced first with a signal detected by the checking circuit unit 20, and judges that the antenna unit 12 of the car-mounted equipment is capable of normally executing the communication when they are in agreement.

Next, described below with reference to FIG. 5 is the checking operation of the case where there exists an obstacle 5 according to the embodiment 1 of the present invention.

In this case, the intensity of reception of the check signal waves D by the checking unit 2 becomes smaller than that of during the above-mentioned normal operation (see FIG. 2).

That is, when the obstacle 5 exists on the main body 1 of the car-mounted equipment in FIG. 5 interrupting the propagation of electromagnetic waves, the free space loss in the compartment becomes $\alpha 1$ [dB]($>\alpha$ [dB]) and the input power level (intensity of reception) of the checking unit 2 becomes $\beta+2\gamma-\alpha 1$ [dBm]($<\beta+2\gamma-\alpha$ [dBm]).

When the input power level ($\beta+2\gamma-\alpha 1$ [dBm]) does not lie within a predetermined range ($\beta+2\gamma-\alpha 1\pm\delta$ [dBm]) necessary for the communication, the checking circuit unit 20 is not capable of detecting the check signal waves D, and produces the detection-impossible state as an alarm signal.

Therefore, the control unit 10 in the car-mounted equipment cannot collate the check signal transmitted from the antenna unit 12 of the car-mounted equipment with the check signal from the checking unit 2, giving rise to the occurrence of reception error.

Therefore, the control unit 10 in the car-mounted equipment so judges that the antenna unit 12 of the car-mounted equipment is not capable of executing the communication, drives the display unit 13 and the voice output unit 14, and informs the driver of alarm by means of a lamp, voice or buzzer.

Next, described below with reference to FIGS. 6 and 7 is the checking operation of when the main body 1 of the car-mounted equipment is inclined according to the embodiment 1 of the invention.

In this case, too, the intensity of reception of check signal waves D by the checking unit 2 is smaller than that of during the above-mentioned normal operation (see FIG. 2).

That is, the antenna unit 12 of the car-mounted equipment has a sharp directivity as shown in FIG. 6. When the antenna unit 12 is greatly inclined together with the main body 1 of the car-mounted equipment as shown in FIG. 7, therefore, the gain of the antenna unit 12 in the direction of the radio device 4 of the road side becomes $\gamma 1$ [dBi]($<\gamma$ [dBi]).

Therefore, the input power of the checking unit 2 becomes $\beta+\gamma 1+\gamma-\alpha$ [dBi]($<\beta+2\gamma-\alpha$ [dBm]).

When the input power level ($\beta+\gamma 1+\gamma-\alpha$ [dBi]) does not lie within a predetermined range ($\beta+2\gamma-\alpha\pm\delta$ [dBi]) necessary for the communication, synchronism between the check signal and the detect signal is not maintained in the control unit 10 in the car-mounted equipment, and reception error occurs in the same manner as described.

Then, the control unit 10 of the car-mounted equipment so judges that the antenna unit 12 of the car-mounted equipment is not capable of executing the communication, and drives the display unit 13 and the voice output unit 14 to produce an alarm.

Thus, the disorder of communication is automatically checked before the vehicle enters into the toll gate. When there exists the obstacle 5 in the compartment interrupting the communication or when the car-mounted equipment is not properly installed, it is so judged that the disorder has occurred and the driver is informed of an alarm.

This makes it possible to avoid such an event that the vehicle must be brought into a halt at the toll gate, and helps eliminate traffic jam or traffic accident near the toll gate.

Further, the check signal waves D are transmitted with an intensity smaller than the intensity with which the signals are usually transmitted from the antenna unit 12 of the car-mounted equipment to the radio device 4 of the road side, without affecting equipment outside the vehicle but the checking unit 2.

The operation for detecting the presence of the obstacle 5 or improperly installed state of the antenna unit 12 is executed when the car-mounted equipment is driven. Therefore, the state of the antenna unit 12 of the car-mounted equipment is quickly informed at the start of the operation.

Further, since the display unit 13 and the voice output unit 14, which are normally equipped components, are used as alarming means when disorder is detected, no additional cost is required, and the driver is reliably informed of the disorderly state.

Further, since the checking unit 2 is installed near the windshield while the main body 1 of the car-mounted equipment is installed near the dashboard, communication is not seriously hindered between the antenna unit 12 of the car-mounted equipment and the radio device 4 of the road side, making it possible to reliably check the communication state of the antenna unit 12 of the car-mounted equipment.

Further, since the control unit 10 in the car-mounted equipment is directly connected to the checking circuit unit 20 through the cable, the data can be reliably exchanged between the control unit 10 in the car-mounted equipment and the checking circuit unit 20.

Though the display unit 13 and the voice output unit 14 were used as alarm means, any other information output means may be employed.

Further, the main body 1 of the car-mounted equipment was installed near the dashboard and the checking unit 2 was installed near the windshield. They, however, may be installed on other portions in the compartment.

Though the antenna-judging means was installed on the side of the checking circuit unit 20, it may be installed on the side of the control unit 10 of the car-mounted equipment or may be installed as an independent means belong to neither the control unit 20 nor the checking circuit unit 20.

The foregoing description has dealt with the case where the toll was automatically collected by using the ETC car-mounted equipment and by exchanging the toll collection data relative to the radio device 4 on the toll road. However, the invention can be adapted to any other DSRC car-mounted equipment to achieve the same action and effect.

Embodiment 2

In the above-mentioned embodiment 1, the check signal waves D are transmitted from the side of the main body 1 of the car-mounted equipment and the intensity of reception is judged on the side of the checking unit 2 at the time of checking the antenna unit 12 of the car-mounted equipment. It is, however, also allowable to judge the intensity of reception on the side of the main body 1 of the car-mounted equipment by transmitting check signal waves D from the side of the checking unit 2.

At the time of checking the antenna unit 12 of the car-mounted equipment, in this case, the control unit 10 in the car-mounted equipment causes the checking circuit unit 20 to transmit check signal waves D of a small level. In response thereto, the checking circuit unit 20 transmits check signal waves D from the checking antenna unit 21 to the antenna unit 12 of the car-mounted equipment.

Embodiment 3

In the above-mentioned embodiment 1, disorder in the antenna unit 12 of the car-mounted equipment was detected at the time of closing the power source circuit (at the time of driving the car-mounted equipment). However, it is also allowable to detect the disorder in the antenna unit 12 of the car-mounted equipment at the time when the vehicle comes into a halt.

Figure 8:
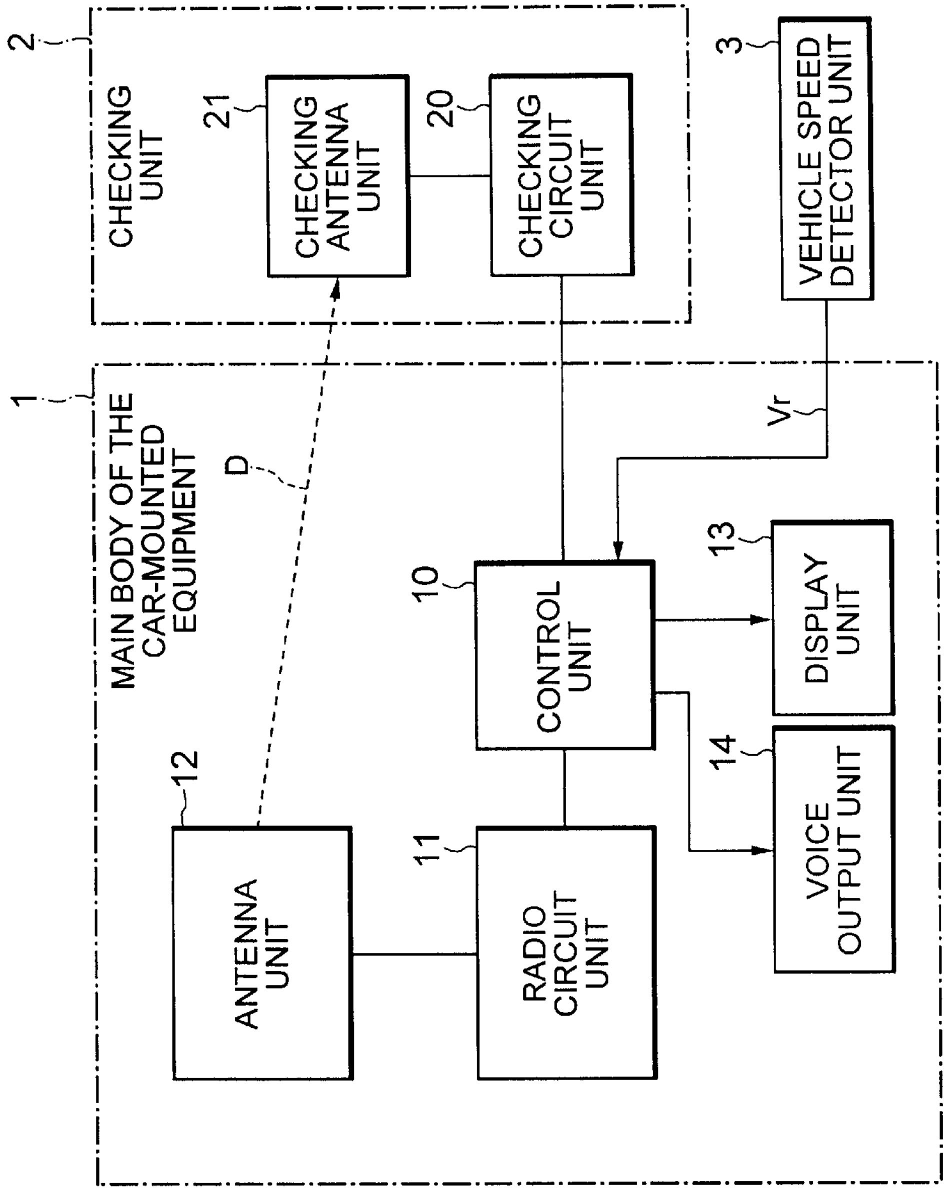
FIG. 8 is a block diagram illustrating the functional constitution according to an embodiment 3 of the present invention.

FIG. 8 is a block diagram illustrating the functional constitution of an embodiment 3 of the present invention of when the checking starts under the halted condition, and wherein the portions similar to those described above (see FIG. 1) are denoted by the same reference numerals, and the portions corresponding to those described above are denoted by the same reference numerals but to which are attached "A" but are not described again in detail.

Figure 9:
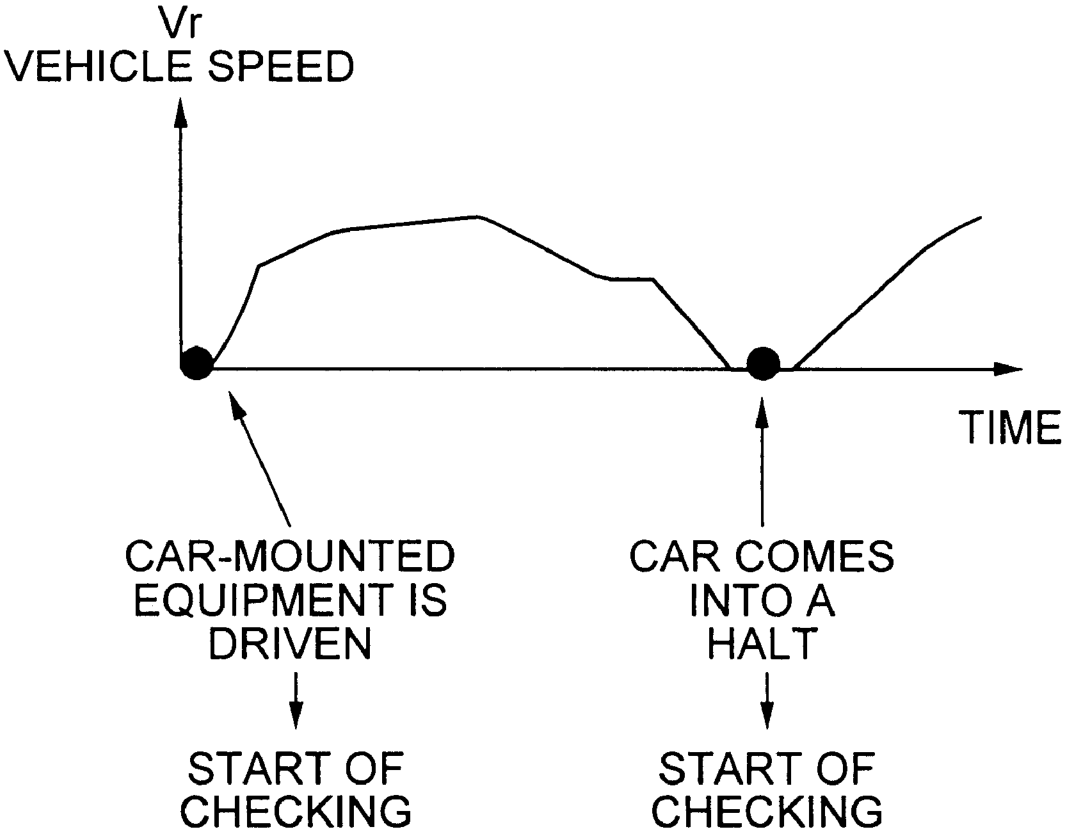
FIG. 9 is a diagram illustrating the operation for detecting check signal waves according to the embodiment 3 of the present invention.

FIG. 9 is a diagram illustrating the operation for detecting check signal waves D according to the embodiment 3 of the present invention, wherein the abscissa represents the time and the ordinate represents the vehicle speed Vr.

In this case, the operation for detecting check signal waves D is executed both when the car-mounted equipment is driven and when the vehicle is brought into a halt.

In FIG. 8, the control unit 10A of the car-mounted equipment is provided with a vehicle speed detector unit 3 that detects the speed Vr of the vehicle.

The control unit 10A of the car-mounted equipment further includes a stop-judging means for judging the state where the vehicle is halted based on the vehicle speed Vr, and transmits check signal waves D when the vehicle comes into a halt.

Thus, the disorder in the antenna unit 12 of the car-mounted equipment is detected not only when the power source circuit is closed but also when the vehicle comes into a halt after the traveling, making it possible to reliably know the condition of the antenna unit 12 of the car-mounted equipment in real time.

When the vehicle comes into a halt, in particular, articles placed in the compartment tend to move. Therefore, checking the presence of the obstacle 5 (see FIG. 5) when the vehicle comes into a halt is effective.

The driving operation is no longer hindered after the vehicle has come into a halt. Therefore, no trouble is caused even when the checking unit, display unit 13 and voice output unit 14 are driven.

Though check signal waves D were transmitted from the main body 1A of the car-mounted equipment to the checking unit 2, it is also allowable to transmit check signal waves D from the checking unit 2 to the main body 1A of the car-mounted equipment to obtain the same action and effect, as a matter of course.

Embodiment 4

In the above-mentioned embodiment 1, the main body 1 of the car-mounted equipment and the checking unit 2 are electrically connected together through the cable. However, the main body 1 of the car-mounted equipment and the checking unit may be constituted being isolated from each other.

In this case, the data are exchanged between the main body of the car-mounted equipment and the checking unit by radio communication using electromagnetic waves like the transmission of check signal waves D.

Figure 10:
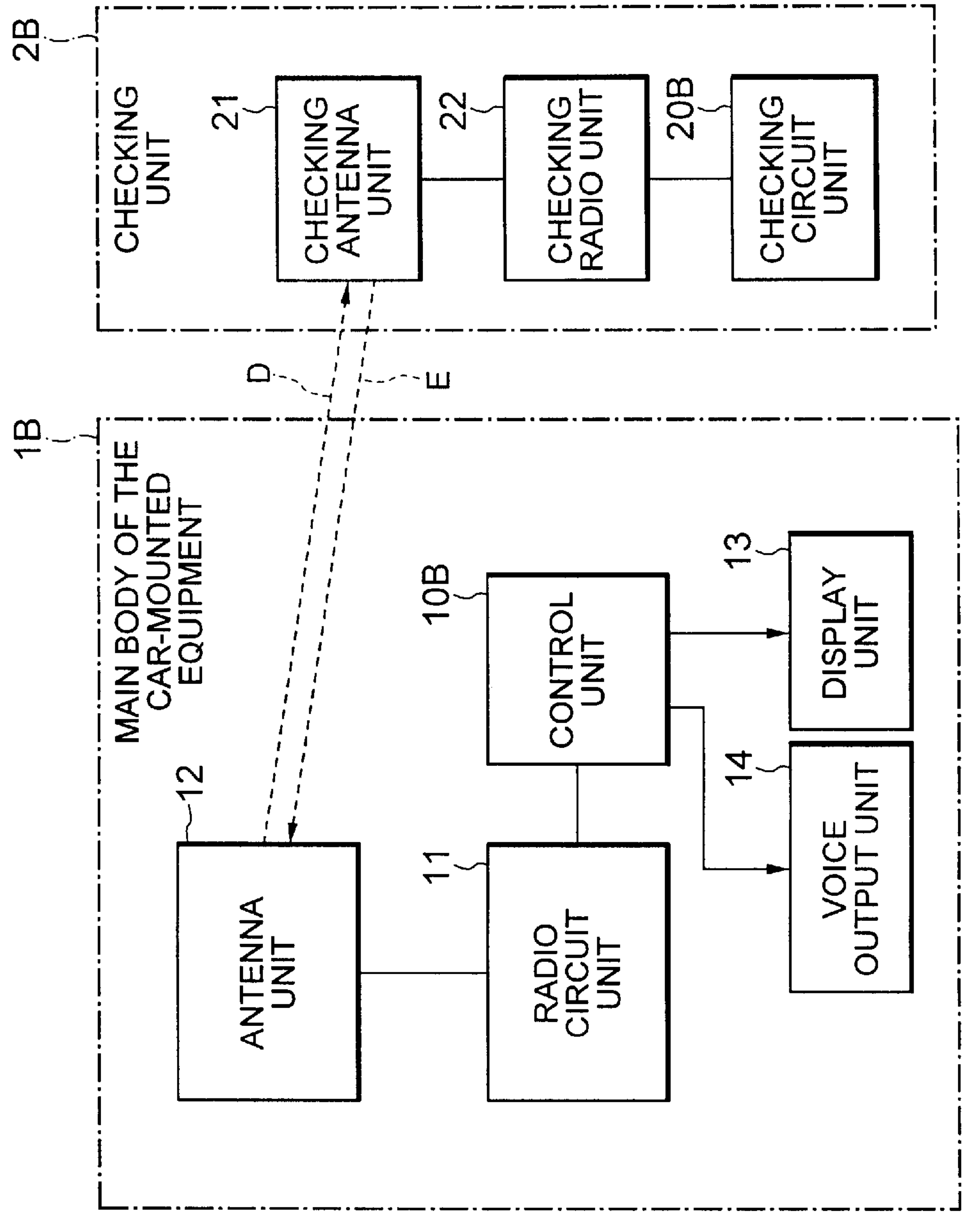
FIG. 10 is a block diagram illustrating the functional constitution according to an embodiment 4 of the present invention.

FIG. 10 is a block diagram illustrating the functional constitution of an embodiment 4 of the present invention, in which the main body of the car-mounted equipment and the checking unit are constituted being isolated from each other, and wherein the portions similar to those described above (see FIG. 1) are denoted by the same reference numerals, and the portions corresponding to those described above are denoted by the same reference numerals but to which are attached "B" but are not described again in detail.

In FIG. 10, the main body 1B of the car-mounted equipment and the checking unit 2B are isolated from each other.

The checking unit 2B has a checking radio unit 22 controlled by the checking circuit unit 20B, and the check signal waves D that are received are detected by the checking radio unit 22.

The checking circuit unit 20B receives check signal waves D transmitted from the antenna unit 12 of the car-mounted equipment through the checking antenna unit 21 and the checking radio unit 22, and transmits various response signals such as detect signal waves E from the checking antenna unit 21 to the antenna unit 12 of the car-mounted equipment through the checking radio unit 22.

In this case, the main body 1B of the car-mounted equipment and the checking unit 2B exchange data by bidirectional communication using weak detect signal waves D and detect signal waves E.

The concrete transmission/reception operation by the main body 1B of the car-mounted equipment 1B and by the checking unit 2B, is the same as the one described above and is not described here in detail.

In FIG. 10, when the power source circuit is closed, the control unit 10B of the car-mounted equipment transmits, by radio communication, a check signal wave D transmission timing from the main body 1B of the car-mounted equipment to the isolated checking unit 2B.

The control unit 10B of the car-mounted equipment includes an antenna unit-judging means and judges whether the communication is normally executed at the time when the check signal waves D are transmitted.

That is, the control unit 10B of the car-mounted equipment collates the result of detect signal detected by the radio circuit unit 11 of the car-mounted equipment with the response signal waves E (detect signal) from the checking unit 2B to judge the condition of the antenna unit 12B of the car-mounted equipment.

Here, when no response signal wave E is obtained from the checking unit 2E, it is so regarded that the communication has not been properly executed, and an alarm signal is produced to drive the display unit 13 and the voice output unit 14 to inform the driver of an alarm.

With the checking unit 2B being isolated from the main body 1B of the car-mounted equipment as described above, no cable is required, the cost can be decreased, and the checking unit 20 can be installed maintaining an increased degree of freedom.

In this case, further, the disorder in the antenna unit 12 of the car-mounted equipment can be judged relying only upon the response signal waves E without comparing the level of reception of the check signal waves D with the predetermined value.

Though the check signal waves D are transmitted from the main body 1B of the car-mounted equipment to the checking unit 2B, it is also allowable to transmit the check signal waves D from the checking unit 2B to the main body 1B of the car-mounted equipment.

What is claimed is:

1. A DSRC car-mounted equipment comprising:

a main body of a car-mounted equipment having a control unit and an antenna unit for executing radio communication with an on-the-road equipment installed on a road on which a vehicle travels;

information output means connected to said control unit;

a checking unit arranged in the vehicle so as to be positioned between said antenna unit of the car-mounted equipment and a radio equipment of the road side of said on-the-road equipment, and having a checking circuit unit and a checking antenna unit for executing radio communication with said antenna unit of the car-mounted equipment; and an antenna-judging means for judging the communication ability of said antenna unit of the car-mounted equipment based on the communication state of check signal waves between said antenna unit of the car-mounted equipment and said checking antenna unit; wherein said antenna-judging means produces an alarm signal when the communication ability of said antenna unit of the car-mounted equipment is smaller than a predetermined value; and said control unit of the car-mounted equipment drives said information output means in response to said alarm signal to produce an alarm.

2. A DSRC car-mounted equipment according to claim 1, wherein said antenna-judging means produces said alarm signal when the reception intensity at said checking antenna unit of the check signal waves transmitted from said antenna unit of the car-mounted equipment is smaller than a predetermined value.

3. A DSRC car-mounted equipment according to claim 1, wherein said antenna-judging means produces said alarm signal when the reception intensity at said antenna unit of the check signal waves transmitted from said checking antenna unit is smaller than a predetermined value.

4. A DSRC car-mounted equipment according to claim 1, wherein the intensity for transmitting said check signal waves is set to a value smaller than a normal transmission intensity of from said antenna unit of the car-mounted equipment to said radio equipment of the road side.

5. A DSRC car-mounted equipment according to claim 1, wherein said check signal waves are transmitted when the power source circuit is closed.

6. A DSRC car-mounted equipment according to claim 1, further comprising a vehicle speed detector unit for detecting the speed of said vehicle, and a stop-judging means for judging the halted state of said vehicle based on said vehicle speed, wherein said check signal waves are transmitted when said vehicle is brought into a halt.

7. A DSRC car-mounted equipment according to claim 1, wherein said information output means includes at least either a display unit or a voice output unit.

8. A DSRC car-mounted equipment according to claim 1, wherein said main body of the car-mounted equipment is arranged near the dashboard of said vehicle, and the checking unit is arranged near the windshield of said vehicle.

9. A DSRC car-mounted equipment according to claim 1, further comprising a cable for electrically connecting said main body of the car-mounted equipment to said checking unit, wherein said control unit of the car-mounted equipment transmits said check signal wave transmission timing to said checking unit through said cable.

10. A DSRC car-mounted equipment according to claim 1, wherein said checking unit is isolated from said main body of the car-mounted equipment, and said equipment control unit of the car-mounted equipment transmits the check signal wave transmission timing to said checking unit by radio communication.

11. A DSRC car-mounted equipment according to claim 10, wherein said antenna-judging means produces an alarm signal when no response signal is obtained from said checking unit at the time of transmitting said check signal waves.

12. A DSRC car-mounted equipment according to claim 1, wherein said control unit of the car-mounted equipment transmits and receives data related to the toll collection to and from the on-the-road equipment installed on a toll road, and automatically receives the toll based on said data related to the toll collection.

* * * * *